(12) United States Patent
Cook et al.

(10) Patent No.: US 10,419,512 B2
(45) Date of Patent: Sep. 17, 2019

(54) SYSTEM AND METHOD OF TRANSMITTING DISPLAY DATA

(71) Applicant: Samsung Display Co., Ltd, Yongin, Gyeonggi-Do (KR)

(72) Inventors: Gregory W. Cook, San Jose, CA (US); Dale Stolitzka, Los Altos, CA (US); Ning Lu, Saratoga, CA (US)

(73) Assignee: Samsung Display Co., Ltd. (KR)

( * ) Notice: Subject to any disclaimer, the term of this patent is extended or adjusted under 35 U.S.C. 154(b) by 528 days.

(21) Appl. No.: 14/970,420

(22) Filed: Dec. 15, 2015

(65) Prior Publication Data

US 2017/0034238 A1 Feb. 2, 2017

Related U.S. Application Data

(60) Provisional application No. 62/197,452, filed on Jul. 27, 2015.

(51) Int. Cl.
| | |
|---|---|
| H04N 7/12 | (2006.01) |
| H04N 7/24 | (2011.01) |
| H04L 29/06 | (2006.01) |
| H04N 19/503 | (2014.01) |
| H04N 19/426 | (2014.01) |

(52) U.S. Cl.
CPC ......... H04L 65/607 (2013.01); H04N 19/426 (2014.11); H04N 19/428 (2014.11); H04N 19/503 (2014.11)

(58) Field of Classification Search
CPC ..... H04N 19/176; H04N 19/593; H04N 19/61
See application file for complete search history.

(56) References Cited

U.S. PATENT DOCUMENTS

| | | | |
|---|---|---|---|
| 6,240,210 B1 | 5/2001 | Koyama | |
| 6,803,968 B1 | 10/2004 | Numata | |
| 8,233,534 B2 | 7/2012 | Wasily | |
| 2004/0057625 A1* | 3/2004 | Onami | H04N 7/18 382/233 |

(Continued)

FOREIGN PATENT DOCUMENTS

| | | |
|---|---|---|
| EP | 1298937 A1 | 4/2003 |
| WO | 2011/047330 A2 | 4/2011 |
| WO | 2011/123882 A2 | 10/2011 |

OTHER PUBLICATIONS

European Search Report for EP Application No. 16181511.3, dated Dec. 13, 2016, pp. 1-9.

*Primary Examiner* — Edemio Navas, Jr.
(74) *Attorney, Agent, or Firm* — Innovation Counsel LLP

(57) ABSTRACT

A system of transmitting display data is presented. The system includes a frame encoding part configured to receive a source frame and output a compressed frame. The frame encoding part has: a difference unit configured to generate a difference frame using the source frame and an encode reference frame; an encode output unit configured to output a compressed version of either the source frame or the difference frame as a compressed frame; and a first compressed frame buffer configured to store a compressed version of the source frame as a new encode reference frame, wherein the frame encoding part further includes a frame decision unit configured to compare the image quality of frames respectively derived from the source frame and the difference frame.

23 Claims, 6 Drawing Sheets

(56) References Cited

U.S. PATENT DOCUMENTS

| | | | |
|---|---|---|---|
| 2005/0169370 A1* | 8/2005 | Lee | H04N 19/124 |
| | | | 375/240.03 |
| 2008/0112486 A1* | 5/2008 | Takahashi | H04N 19/105 |
| | | | 375/240.12 |
| 2008/0260023 A1 | 10/2008 | Sung | |
| 2009/0086818 A1 | 4/2009 | Kim | |
| 2011/0211637 A1* | 9/2011 | Blum | H04N 19/147 |
| | | | 375/240.16 |
| 2012/0106644 A1* | 5/2012 | Henry | H04N 19/105 |
| | | | 375/240.16 |
| 2013/0243100 A1 | 9/2013 | Liu et al. | |
| 2013/0301711 A1* | 11/2013 | Agthe | H04N 19/159 |
| | | | 375/240.03 |
| 2014/0205016 A1 | 7/2014 | Yang et al. | |

* cited by examiner

SYSTEM AND METHOD OF TRANSMITTING DISPLAY DATA

CROSS-REFERENCE TO RELATED APPLICATIONS

This application claims priority to and the benefit of U.S. Provisional Patent Application No. 62/197,452 titled "Compressed Frame Buffer Hold Compression" that was filed on Jul. 27, 2015, the entire content of which is incorporated herein by reference.

RELATED FIELD

The present disclosure relates to a system and method of transmitting display data.

BACKGROUND

As the resolution of display devices increases, the amount of information that needs to be communicated to a display device (e.g., from a host system), or between internal components of the display device, significantly increases. To illustrate, a display device with a 4K resolution (i.e., 3840×2160) has roughly four times the number of pixels as a display device with a 1920×1080 resolution. This means roughly four times the amount of information needs to be communicated to or within the higher resolution display device.

One way to handle the significant increase in the amount of display information is to increase the physical bandwidth or capacity of the channel over which the information is transmitted. Another way is to compress the information before transmitting it over the channel. However, implementing prior systems and methods of data compression may excessively increase the complexity and, therefore, cost of the display device.

Accordingly, in view of the current trend in which higher and higher resolution display devices are being produced, there exists a need for a system and method of transmitting display data that is not overly complex.

SUMMARY

The present disclosure provides a system of transmitting display data. The system includes a frame encoding part configured to receive a source frame and output a compressed frame. The frame encoding part has: a difference unit configured to generate a difference frame using the source frame and an encode reference frame; an encode output unit configured to output a compressed version of either the source frame or the difference frame as a compressed frame; and a first compressed frame buffer configured to store a compressed version of the source frame as a new encode reference frame, wherein the frame encoding part further includes a frame decision unit configured to compare the image quality of frames respectively derived from the source frame and the difference frame.

The present disclosure also provides a method of transmitting display data. The method includes: receiving a source frame by a frame encoding part; generating a difference frame using the source frame and an encode reference frame; storing a compressed version of the source frame as a new encode reference frame; and outputting a compressed version of either the source frame or the difference frame as a compressed frame.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
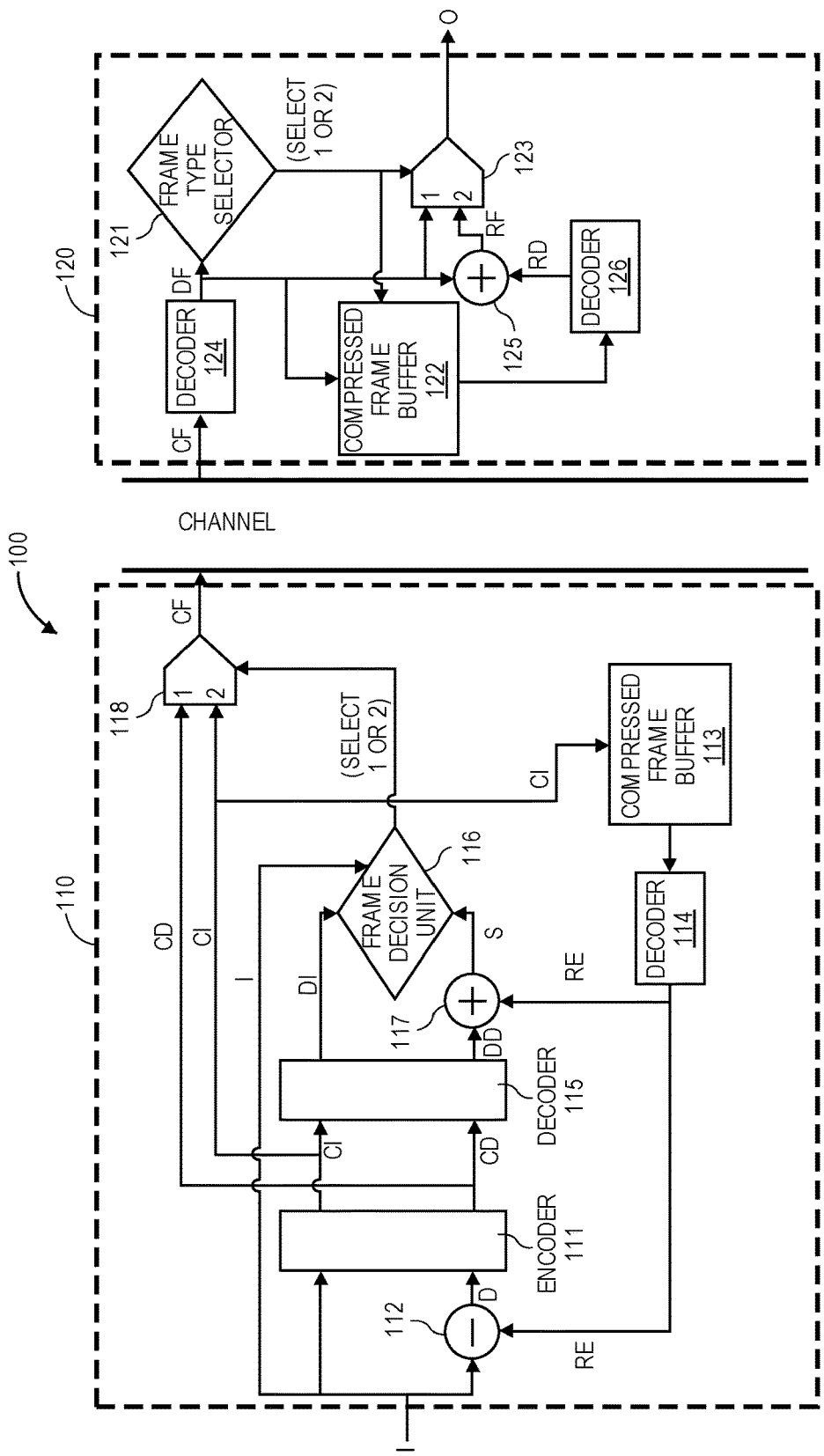
FIG. 1 illustrates an exemplary implementation of a system and method of transmitting display data, according to an embodiment.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

According to an exemplary embodiment, the present system and method utilize a compressed frame buffer in a decoding part to improve the quality of a still image by temporally integrating a standard frame and a difference frame. As used herein, a "standard frame," or just "frame," refers to display data for rendering a complete, still image, whereas a "difference frame" refers to difference data corresponding to a difference between two frames. Thus, generally, a difference frame by itself does not contain all the data for rendering a complete, still image. A video may comprise a plurality of frames.

When a standard frame is sent to the decoding part, the standard frame, which is already in a compressed form, is stored in the compressed frame buffer of the decoding part as a new decode reference frame. Also, the decoding part decompresses and outputs the standard frame. When a difference frame is sent to the decoding part, the decoding part outputs a reconstructed frame that is formed by combining the difference frame with a previously stored decode reference frame.

FIG. 1 illustrates an exemplary implementation of a system and method of transmitting display data. Referring to FIG. 1, the system 100 includes a frame encoding part 110 and a frame decoding part 120 that are connected via a channel. The channel may take any form that allows data to be transmitted from the frame encoding part 110 to the frame decoding part 120. As non-limiting examples, the channel may be a bus connection between a display panel and a display driver within a display device or a cable connection between the display device and an external host system. The system 100 receives a source frame I as an input and outputs a final frame O for display. The image quality of the final frame O may closely approximate the image quality of the source frame I.

The frame encoding part 110 includes an encoder 111, a difference unit 112, a compressed frame buffer 113, decoders 114 and 115, a frame decision unit 116, a summation unit 117, and a multiplexer 118. Although FIG. 1 shows these components as separate components, one or more of these components may be combined. For example, instead of being separate decoders 114 and 115, they may be the same decoder or, in another example, the encoder 111 may be combined with the decoder 115.

During a frame period t, the encoding part 110 receives the source frame I and inputs it into the difference unit 112, which performs a difference operation on the source frame I using an encode reference frame RE, and the encoder 111. Particularly, the difference unit 112 subtracts the encode reference frame RE from the source frame I to generate a difference frame D. The encode reference frame RE is retrieved from the compressed frame buffer 113 and decompressed by the decoder 114 prior to being input to the difference unit 112. The difference unit 112 outputs the difference frame D to the encoder 111.

The encoder 111 receives and compresses each of the source frame I and the difference frame D. The encoder 111 then outputs the compressed source frame CI and the compressed difference frame CD to the decoder 115. The encoder 111 and decoder 115 may ensure that identical reference frames are generated.

The decoder 115 decompresses each of the compressed source frame CI and the compressed difference frame CD and outputs a decompressed source frame DI and a decompressed difference frame DD. The decompressed source frame DI is output to the frame decision unit 116, and the decompressed difference frame DD is output to the summation unit 117. The summation unit 117 adds the decompressed difference frame DD and the encode reference frame RE and outputs the summation frame S to the frame decision unit 116.

The frame decision unit 116 evaluates and compares the image quality of each of the summation frame S and the decompressed source frame DI with that of frame I and outputs a comparison decision signal to the multiplexer 118. That is, in making the comparison, the frame decision unit 116 determines which of the summation frame S and the decompressed source frame DI has an image quality that is the closest to or best approximates frame I. The frame decision unit 116 may evaluate and compare the image quality of its input frames using any number of techniques, including, for example, threshold analysis and means-square-error (MSE) analysis.

The multiplexer 118 receives the compressed source frame CI and the compressed difference frame CD as inputs. Depending on the comparison decision signal received from the frame decision unit 116, the multiplexer 118 outputs either the compressed source frame CI or the compressed difference frame CD to the channel as a compressed frame CF. For example, if the frame decision unit 116 determines that the decompressed source frame DI, which is derived from the compressed source frame CI, has a better image quality compared to the summation frame S (i.e., closer to I than S is), the multiplexer 118 may output the compressed source frame CI as the compressed frame CF, and the compressed frame buffer 113 may store the compressed source frame CI in the compressed frame buffer 113 as a new encode reference frame so that it may be used to generate difference frames during subsequent frame periods >t.

On the other hand, if the frame decision unit 116 decides that the summation frame S, which is derived from the compressed difference frame CD, has a better image quality compared to the decompressed source frame DI, the multiplexer 118 may output the compressed difference frame CD as the compressed frame CF. The compressed frame CF may be encoded with a flag (not shown) that indicates whether the compressed frame is a standard frame (i.e., the compressed source frame CI) or a difference frame (i.e., the compressed difference frame CD).

The comparison of the image quality of the decompressed source frame DI and that of the summation frame S is made with reference to frame I. That is, if the decompressed source frame DI is closer to or better approximates frame I, then the decompressed source frame DI is chosen. On the other hand, if the summation frame S is closer to or better approximates frame I, then the summation frame is chosen.

The decoding part 120 receives the compressed frame CF from the channel. The decoding part 120 includes a frame type selector 121, a compressed frame buffer 122, a multiplexer 123, decoders 124 and 126, and a summation unit 125. Although FIG. 1 shows these components as separate components, one or more of these components may be combined. For example, instead of being separate decoders 124 and 126, they may be the same decoder.

The decoder 124 decompresses the compressed frame CF and outputs a decompressed frame DF. The frame type selector 121 receives the decompressed frame DF as an input and determines whether the decompressed frame DF is a standard frame or a difference frame, for example, by evaluating a flag encoded or sent as part of the compressed frame CF. Having determined the type of the decompressed frame DF, the frame type selector 121 outputs a decision signal to the compressed frame buffer 122 and the multiplexer 123.

If the frame type selector 121 determines that the decompressed frame DF is a standard frame, the frame type selector 121 instructs the compressed frame buffer 122 via the decision signal to store the compressed frame CF as a new decode reference frame, which may be used to generate reconstructed frames (described further below) during subsequent frame periods >t. The frame type selector 121 also instructs the multiplexer 123 to output the decompressed frame DF as the final frame O for display as an image.

If the frame type selector 121 determines that the decompressed frame DF is a difference frame, the frame type selector 121 instructs the multiplexer 123 to output a reconstructed frame RF as the final frame O. The reconstructed frame RF is generated by the summation unit 125, which adds the decompressed frame DF, a difference frame in this case, to a decode reference frame RD. The decode reference frame RD is retrieved from the compressed frame buffer 122 and decompressed by the decoder 126 prior to being input to the summation unit 125. If retrieving the decode reference frame RD from the compressed frame buffer 122 is destructive (i.e., deletes it), the decode reference frame RD may be stored again after its retrieval so that it is available for use during subsequent frame periods >t.

Thus, to summarize FIG. 1, if a standard frame is sent for display, the incoming source frame is compressed on the left side by the encoding part 110, stored as a new encode reference frame in the compressed frame buffer 113, and transmitted through the channel as a compressed frame. After being received by the decoding part 120, the compressed frame is stored as a new decode reference frame in the compressed frame buffer 122, decompressed, and then output as the final frame for display. On the other hand, if a difference frame is sent for display, the incoming source frame is differenced with a referenced frame, compressed, and then sent over the channel with a flag indicating that it is a difference frame. After being received by the decoding part 120, the compressed difference frame is decompressed and added to a decode reference frame retrieved from the compressed frame buffer 122 to generate the final frame for display.

According to the exemplary embodiment of FIG. 1, difference frames may be sent instead of standard frames when consecutive source frames display the same or substantially similar images (e.g., a video still or slow changing image). Doing so would be advantageous because the differences between consecutive frames are minor, and it would not require significant amounts of channel bandwidth to transfer the difference frames. Also, a final frame generated from a difference frame tends to have a better image quality because the same source image is effectively transferred twice or more times over the channel but with the channel loss of roughly a single transfer. However, when consecutive frames display drastically different images, or when the first source frame is being sent, standard frames may be sent instead of difference frames. In any event, the frame decision unit 116, which determines whether a standard frame (i.e., the compressed source frame) or a difference frame (i.e., the compressed difference frame) is sent over the channel, ensures that the image quality of the final frame is not worse than if the standard frame is sent.

Figure 2:
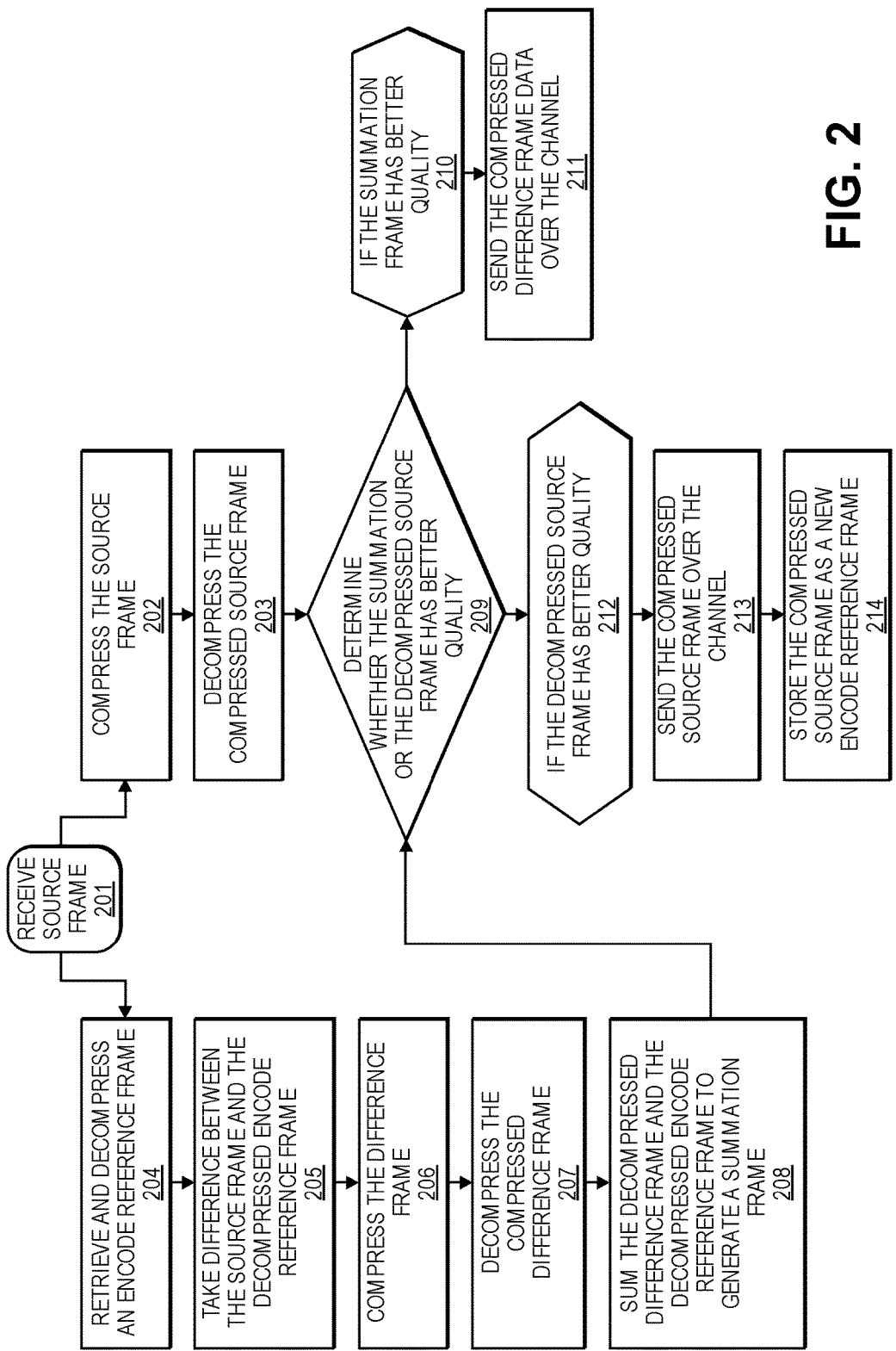
FIG. 2 illustrates a flowchart of the exemplary operations of an encoding part of FIG. 1, according to an embodiment.

FIG. 2 illustrates a flowchart of the exemplary operations of the encoding part of FIG. 1, according to an embodiment. The encoding part receives a source frame (201). The encoding part compresses the source frame to generate a compressed source frame (202) and then decompresses the compressed source frame to generate a decompressed source frame (203).

The encoding part retrieves and decompresses an encode reference frame from a first compressed frame buffer to generate a decompressed encode reference frame (204). The encoding part takes the difference between the source frame and the decompressed encode reference frame to generate a difference frame (205). The encoding part compresses the difference frame to generate a compressed difference frame (206). The encoding part decompresses the compressed difference frame to generate a decompressed difference frame (207). The encoding part sums the decompressed difference frame and the decompressed encode reference frame to generate a summation frame (208).

The encoding part evaluates and compares the summation frame and the decompressed source frame to determine which one thereof has a better image quality (209). If the summation frame, which is derived from the compressed difference frame, has a better image quality (210), the encoding part sends the compressed difference frame over the channel (211). If the decompressed source frame, which is derived from the compressed source frame, has a better image quality (212), the encoding part sends the compressed source frame over the channel as a standard frame (213) and stores the compressed source frame in the first compressed frame buffer as a new encode reference frame (214).

Figure 3:
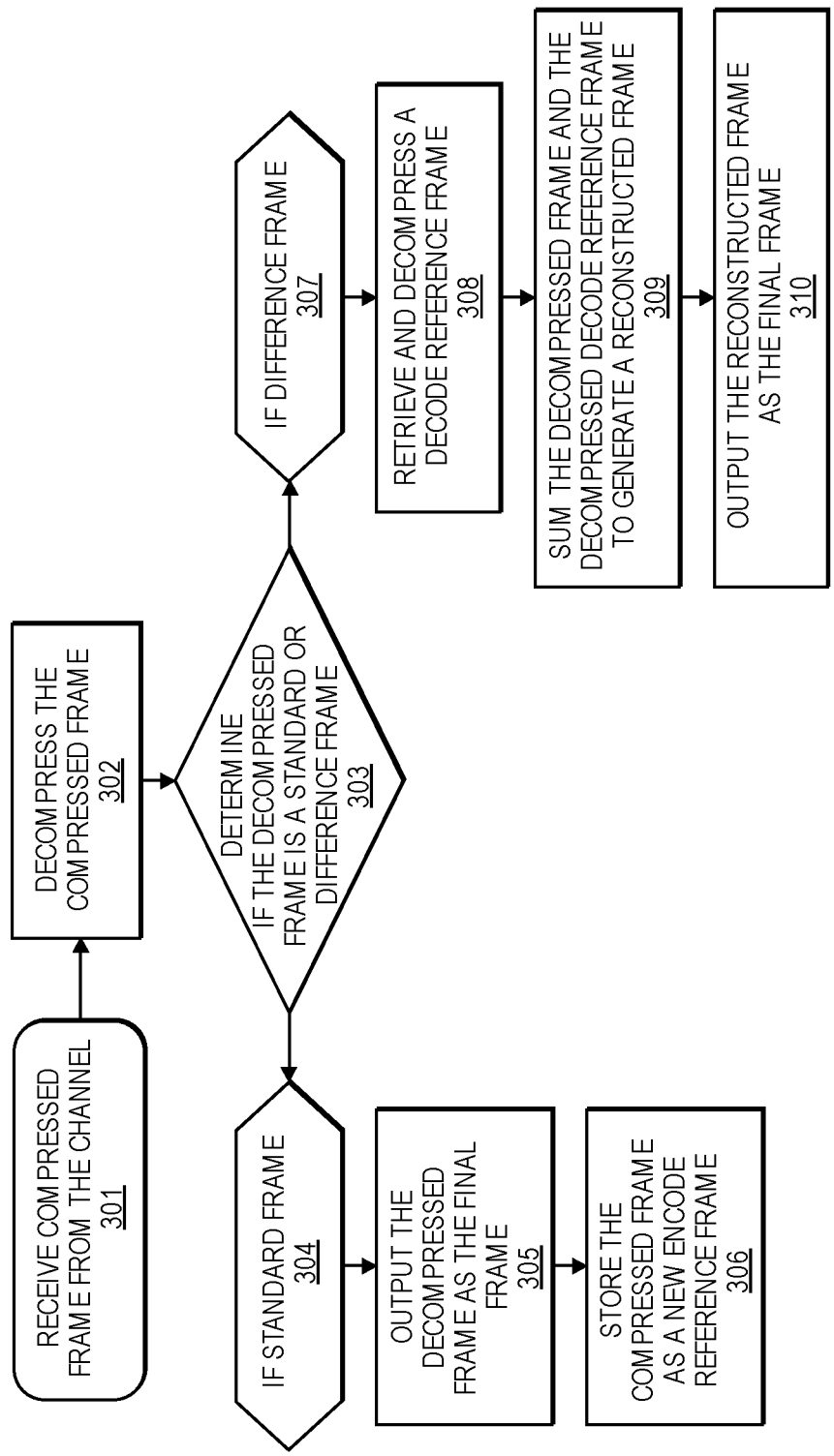
FIG. 3 illustrates a flowchart of the exemplary operations of a decoding part of FIG. 1, according to an embodiment.

FIG. 3 illustrates a flowchart of the exemplary operations of the decoding part of FIG. 1, according to an embodiment. The decoding part receives a compressed frame from the channel (301) and decompresses the compressed frame to generate a decompressed frame (302). The decoding part determines whether the decompressed frame is a standard frame or a difference frame (303).

If the decompressed frame is a standard frame (304), the decoding part outputs the decompressed standard frame as a final frame for display (305). The decoding part also stores the compressed frame as a new decode reference frame in a second compressed frame buffer (306).

If the decompressed frame is a difference frame (307), the decoding part retrieves and decompresses a decode reference frame from the second compressed frame buffer to generate a decompressed decode reference frame (308). The decoding part then sums the decompressed frame and the decompressed decode reference frame to generate a reconstructed frame (309) and outputs the reconstructed frame as the final frame for display (310).

In the case of FIG. 1 and described above, only a standard frame is written to the compressed frame buffer 122 of the decoding part 120, while a difference frame is not. However, in other embodiments, it is contemplated that difference frames may also be stored in a second compressed frame buffer.

Furthermore, in some embodiments, instead of just combining the decode reference frame with a difference reference frame to generate the reconstructed frame, a predictive frame (e.g., one created by a motion vector) may be used. For example, if motion vectors are sent along with the difference frame, the motion vectors may be used to transform the decode reference frame to generate the predictive frame. Then, the reconstructed frame may be generated by combining the difference frame and the predictive frame.

Also, in some embodiments, the operation of the frame decision unit 116 may be performed prior to the compression operation of the encoder 111. This would save the need to compress twice but with a reduced effectiveness in determining final quality.

Figure 4:
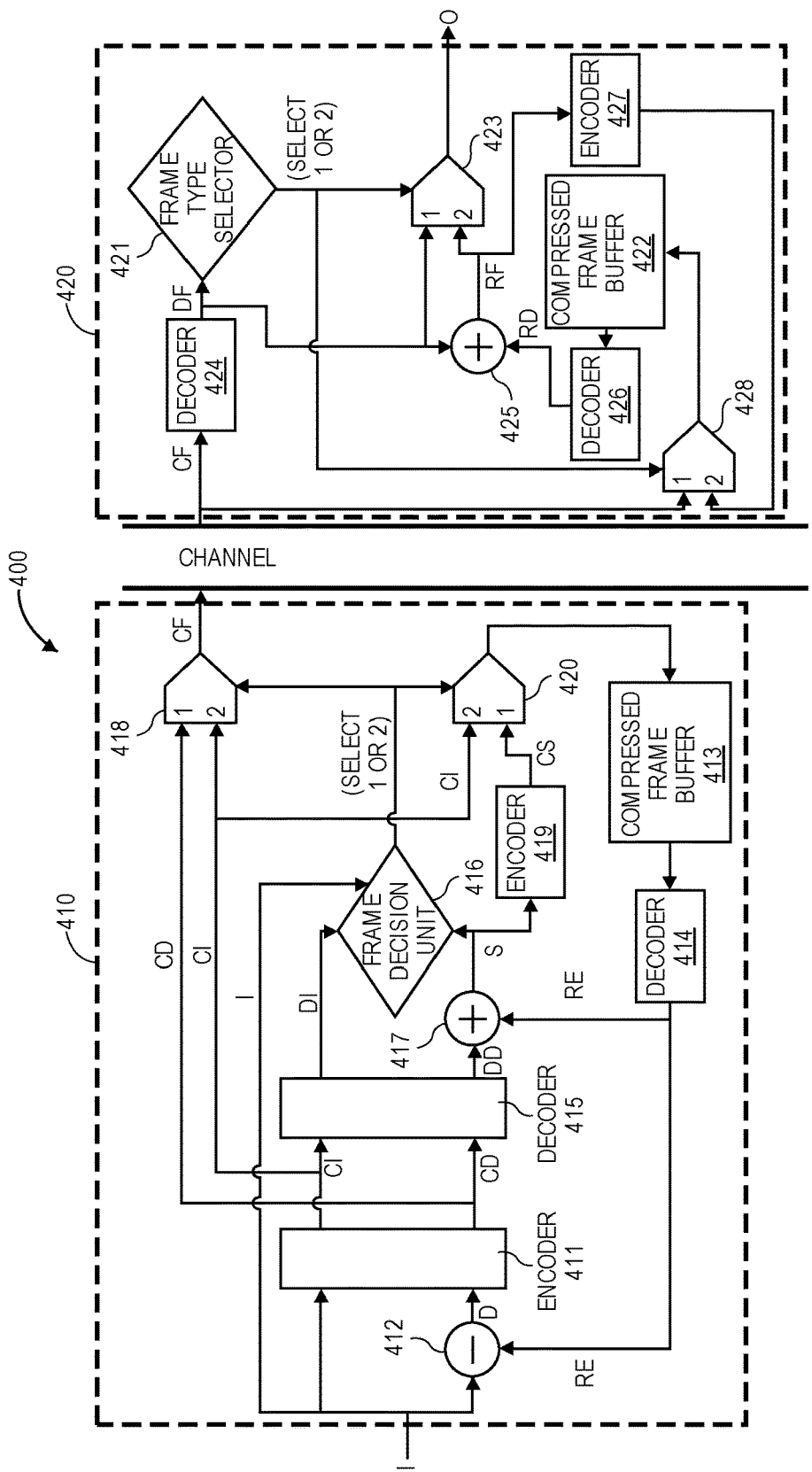
FIG. 4 illustrates another implementation of a system and method of transmitting display data, according to embodiment.

FIG. 4 illustrates another exemplary implementation of the present system and method, according to an embodiment. A difference between the embodiment of FIG. 4 and that of FIG. 1 is that FIG. 4 has an extra encoder in each of its frame encoding part and frame decoding part, thereby increasing its complexity. In other words, in the embodiment of FIG. 1, the compressed frame is stored directly in the compressed frame buffer 122, whereas in the embodiment of FIG. 4, which is described in further detail below, the compressed frame may be decompressed and then recompressed before being stored in a compressed frame buffer 422. As used herein, storing the compressed frame "directly" in the compressed frame buffer means the compressed frame is stored without being further processed by an encoder.

Referring to FIG. 4, the system 400 includes a frame encoding part 410 and a frame decoding part 420 that are connected via a channel. The channel may take any form that allows data to be transmitted from the frame encoding part 410 to the frame decoding part 420. The system 400 receives a source frame I as an input and outputs a final frame O. The image quality of the final frame O may closely approximate the image quality of the source frame I.

The encoding part 410 includes encoders 411 and 419, a difference unit 412, a compressed frame buffer 413, decoders 414 and 415, a frame decision unit 416, a summation unit 417, and multiplexers 418 and 420. Although FIG. 4 shows these components as separate components, one or more of these components may be combined. For example, instead of being separate decoders 414 and 415, they may be the same decoder. In another example, the decoder 415 may be integrated into the encoder 411.

During a frame period t, the encoding part 410 receives the source frame I and inputs it into the difference unit 412, which performs a difference operation on the source frame I using an encode reference frame RE, and the encoder 411. Particularly, the difference unit 412 subtracts the encode reference frame RE from the source frame I to generate a difference frame D. The encode reference frame RE is retrieved from the compressed frame buffer 413 and decompressed by the decoder 414 prior to being input to the difference unit 412. The difference unit 412 outputs the difference frame D to the encoder 411.

The encoder 411 receives and compresses each of the source frame I and the difference frame D. The encoder 411 then outputs the compressed source frame CI and the compressed difference frame CD to the decoder 415. The encoder 411 and decoder 415 may serve as a pair of intra-frame encoder-decoders that ensures identical reference frames are generated.

The decoder 415 decompresses each of the compressed source frame CI and the compressed difference frame CD and outputs a decompressed source frame DI and a decompressed difference frame DD. The decompressed source frame DI is output to the frame decision unit 416, and the decompressed difference frame DD is output to the summation unit 417. The summation unit 417 adds the decompressed difference frame DD and the encode reference frame RE and outputs the summation frame S to the frame decision unit 416 and the encoder 419.

The frame decision unit 416 evaluates and compares the image quality of the summation frame S and the decompressed source frame DI and outputs a comparison decision signal to the multiplexers 418 and 420. The frame decision unit 416 may evaluate and compare the image quality of its input frames using any number of techniques, including, for example, threshold analysis and means-square-error (MSE) analysis.

The multiplexer 418 receives the compressed source frame CI and the compressed difference frame CD as inputs. Depending on the comparison decision signal received from the frame decision unit 416, the multiplexer 418 outputs either the compressed source frame CI or the compressed difference frame CD to the channel as a compressed frame CF. For example, if the frame decision unit 416 determines that the decompressed source frame DI, which is derived from the compressed source frame CI, has a better image quality compared to the summation frame S, the multiplexer 418 may output the compressed source frame CI as the compressed frame CF, and the compressed frame buffer 413 may store the compressed source frame CI in the compressed frame buffer 413 as a new encode reference frame so that it may be used to generate difference frames during subsequent frame periods >t.

On the other hand, if the frame decision unit 416 decides that the summation frame S, which is derived from the compressed difference frame CD, has a better image quality compared to the decompressed source frame DI, the multiplexer 418 may output the compressed difference frame CD as the compressed frame CF. The compressed frame CF may be encoded with a flag (not shown) that indicates whether the compressed frame is a standard frame (i.e., the compressed source frame CI) or a difference frame (i.e., the compressed difference frame CD).

The encoder 419 compresses the summation frame S to generate a compressed summation frame. The multiplexer 420 receives the compressed source frame CI and the compressed summation frame CS as inputs. Depending on the comparison decision signal received from the frame decision unit 416, the multiplexer 420 outputs either the compressed source frame CI or the compressed summation frame CS to the compressed frame buffer 413 for storage as a new encode reference frame.

Thus, unlike the embodiment of FIG. 1 in which only the compressed source frame CI is stored in the compressed frame buffer 113 when it is output by the multiplexer 118, the embodiment of FIG. 4 stores either the compressed source frame CI or the compressed summation frame CS in accordance with whichever one of the compressed source frame CI and the compressed difference frame CD is output by the multiplexer 418. For example, if the multiplexer 418 outputs the compressed source frame CI, then the multiplexer 420 outputs the compressed source frame CI for storage in the compressed frame buffer 413. If the multiplexer 418 outputs the compressed difference frame CD, then the multiplexer 420 outputs the compressed summation frame CS for storage in the compressed frame buffer 413.

The decoding part 420 receives the compressed frame CF from the channel. The decoding part 420 includes a frame type selector 421, a compressed frame buffer 422, a multiplexer 423, a second multiplexer 428, decoders 424 and 426, a summation unit 425, and an encoder 427. Although FIG. 4 shows these components as separate components, one or more of these components may be combined. For example, instead of being separate decoders 424 and 426, they may be the same decoder.

The decoder 424 decompresses the compressed frame CF and outputs a decompressed frame DF. The frame type selector 421 receives the decompressed frame DF as an input and determines whether the decompressed frame is a standard frame or a difference frame, for example, by evaluating a flag encoded or sent as part of the compressed frame CF. Having determined the type of the decompressed frame DF, the frame type selector 421 outputs a decision signal to the multiplexer 423.

If the frame type selector 421 determines that the decompressed frame DF is a standard frame, the frame type selector 421 instructs the multiplexer 423 to output the decompressed frame DF as the final frame O for display as an image. If the frame type selector 421 determines that the decompressed frame DF is a difference frame, the frame type selector 421 instructs the multiplexer 423 to output a reconstructed frame RF as the final frame O. The reconstructed frame RF is generated by the summation unit 425, which adds the decompressed frame DF, a difference frame in this case, to a decode reference frame RD. The decode reference frame RD is retrieved from the compressed frame buffer 422 and decompressed by the decoder 426 prior to being input to the summation unit 425.

Furthermore, the encoder 427 compresses the frame RF and outputs it to multiplexer 428. If the frame type selector 421 determines that the decompressed frame DF is a standard frame, the frame type selector 421 instructs the multiplexer 428 to output the compressed frame CF for storage as a new decode reference frame. If the frame type selector 421 determines that the decompressed frame DF is a difference frame, the frame type selector 421 instructs the multiplexer 428 to output the compressed frame RF to the compressed frame buffer 422 for storage as a new decode reference frame. Both frames may be used to generate reconstructed frames during subsequent frame periods >t. In contrast, the embodiment of FIG. 1 only stores the compressed frame CF in the compressed frame buffer 113 when the compressed frame CF is a standard frame.

Advantages of the embodiment of FIG. 4 over the embodiment of FIG. 1 generally include an improvement in the image display quality over a sequence of images when transmitting at a lower bitrate and an improvement over baseline when encoding slowly moving temporal images when transmitting at the full bitrate. However, because the embodiment of FIG. 4 requires an additional encoder in each of the encoding part and decoding part, it has added complexity that may translate to increased power usage, increased design and manufacturing costs, and reduced reliability. Thus, advantages of the embodiment of FIG. 1 over the embodiment of FIG. 4 generally include simplified encoder/decoder models, same quality still images, and no worse quality than baseline compression techniques for moving images.

Figure 5:
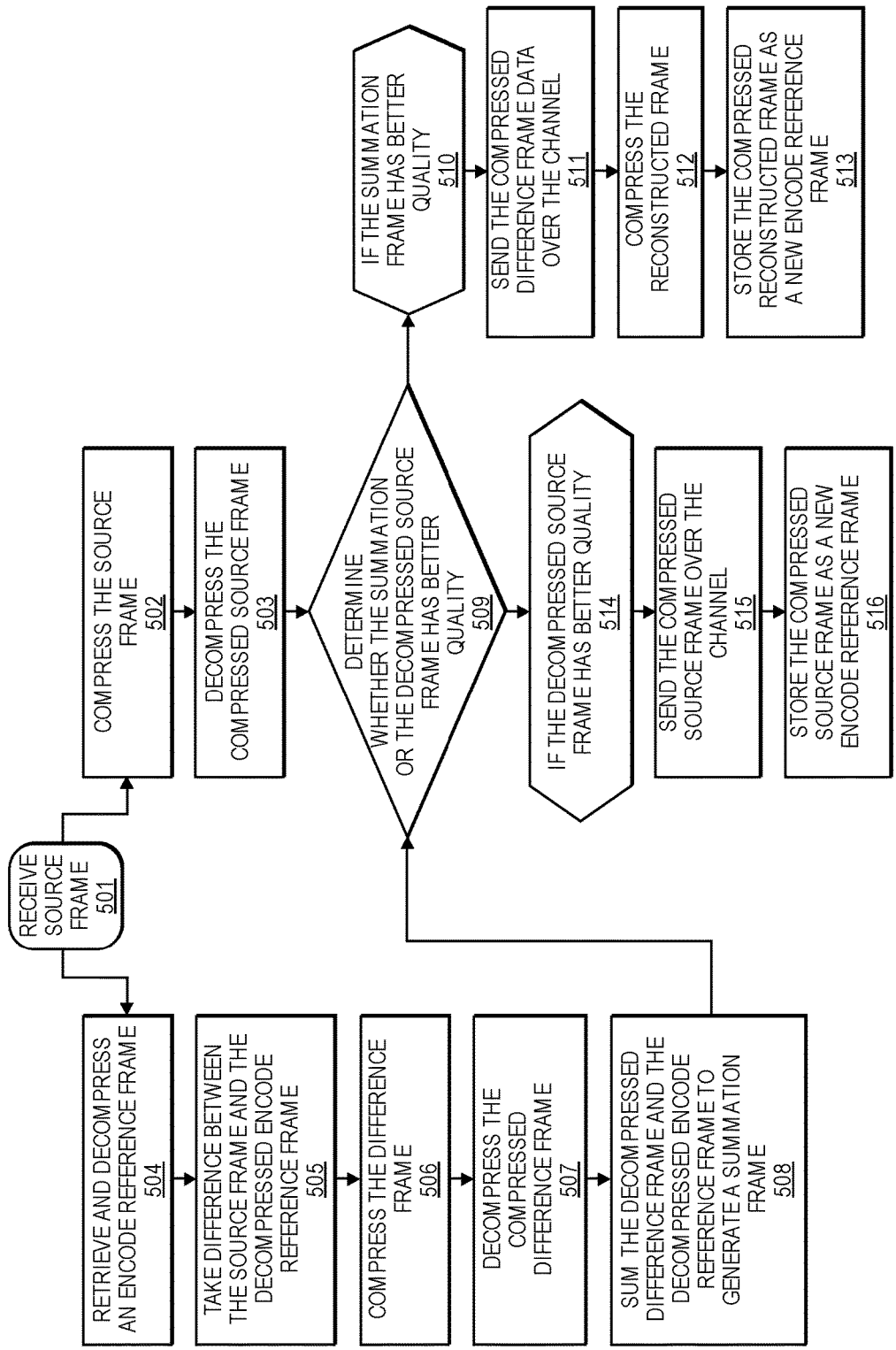
FIG. 5 illustrates a flowchart of the exemplary operations of an encoding part of FIG. 4, according to an embodiment.

FIG. 5 illustrates a flowchart of the exemplary operations of the encoding part of FIG. 4, according to an embodiment. The encoding part receives a source frame (501). The encoding part compresses the source frame to generate a compressed source frame (502) and then decompresses the compressed source frame to generate a decompressed source frame (503).

The encoding part retrieves and decompresses an encode reference frame from a first compressed frame buffer to generate a decompressed encode reference frame (504). The encoding part takes the difference between the source frame and the decompressed encode reference frame to generate a difference frame (505). The encoding part compresses the difference frame to generate a compressed difference frame (506). The encoding part decompresses the compressed difference frame to generate a decompressed difference frame (507). The encoding part sums the decompressed difference frame and the decompressed encode reference frame to generate a summation frame (508).

The encoding part evaluates and compares the summation frame and the decompressed source frame to determine which one thereof has a better image quality (509). If the summation frame, which is derived from the compressed difference frame, has a better image quality (510), the encoding part sends the compressed difference frame over the channel (511). The encoding part then also compresses the summation frame (512) and stores the compressed summation frame in the first compressed frame buffer as a new encode reference frame (513).

On the other hand, if the decompressed source frame, which is derived from the compressed source frame, has a better image quality (514), the encoding part sends the compressed source frame over the channel as a standard frame (515) and stores the compressed source frame in the first compressed frame buffer as the new encode reference frame (516).

Figure 6:
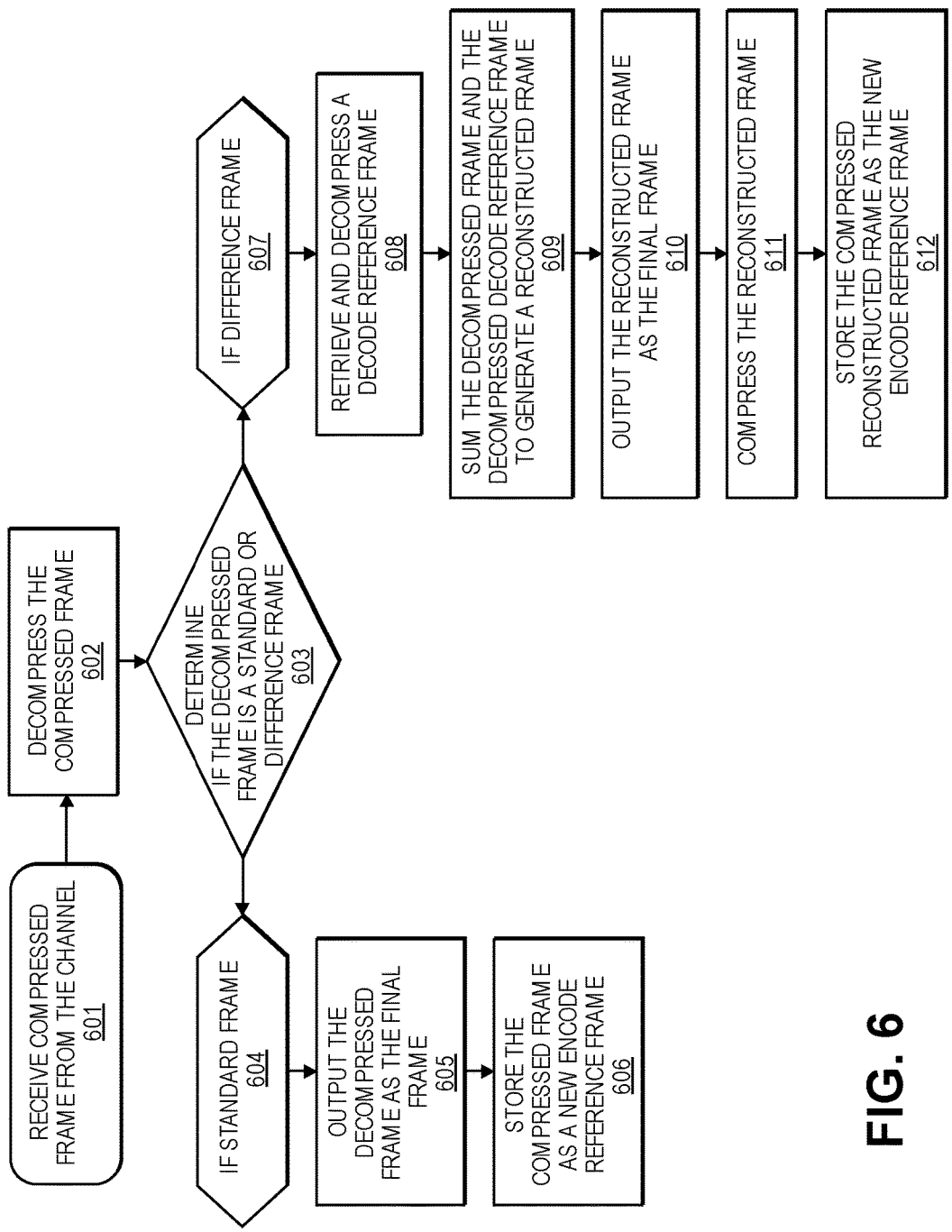
FIG. 6 illustrates a flowchart of the exemplary operations of a decoding part of FIG. 4, according to an embodiment.

FIG. 6 illustrates a flowchart of the exemplary operations of the decoding part of FIG. 4, according to an embodiment. The decoding part receives a compressed frame from the channel (601) and decompresses the compressed frame to generate a decompressed frame (602). The decoding part then determines whether the decompressed frame is a standard frame or a difference frame (603).

If the decompressed frame is a standard frame (604), the decoding part outputs the decompressed frame as a final frame for display (605). The decoding part also stores the compressed frame received from the channel as a new decode reference frame in a second compressed frame buffer (606).

On the other hand, if the decompressed frame is a difference frame (607), the decoding part retrieves and decompresses a decode reference frame from the second compressed frame buffer to generate a decompressed decode reference frame (608). The decoding part then sums the decompressed frame and the decompressed decode reference frame to generate a reconstructed frame (609) and outputs the reconstructed frame as the final frame for display (610). The decoding part then compresses the reconstructed frame (611) and stores the compressed reconstructed frame in the second compressed frame buffer as the new decode reference frame (612).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A system of transmitting display data, the system comprising:
    a frame encoding part configured to receive a source frame and output a compressed frame, the frame encoding part having:
        a difference unit configured to generate a difference frame using the source frame and an encode reference frame;
        an encode output unit configured to output the source frame or the difference frame as a compressed frame, the source frame or the difference frame being output having been compressed; and
        a first compressed frame buffer configured to store the source frame as a new encode reference frame, the source frame being stored having been compressed,
        wherein the frame encoding part further includes a frame decision unit configured to compare the image quality of frames respectively derived from the source frame and the difference frame,
        wherein the encode output unit outputs the difference frame in response to a determination by the frame decision unit that, when the frames respectively derived from the source frame and the difference frame are each compared to the source frame, a frame derived from the difference frame has an image quality closer to the source frame.

2. The system of claim 1, wherein the image quality of frames respectively derived from the source frame and the difference frame includes comparing against the source frame.

3. The system of claim 1, wherein the encode output unit outputs the source frame in response to a determination by the frame decision unit that a frame derived from the source frame has a better image quality.

4. The system of claim 1, further comprising:
    a frame decoding part configured to receive the compressed frame from the frame encode part, the frame decoding part having:
        a frame summation unit configured to generate a reconstructed frame using the compressed frame and a decode reference frame;
        a decode output unit configured to output the reconstructed frame; and
        a second compressed frame buffer configured to store the compressed frame as a new decode reference frame.

5. The system of claim 4, wherein the compressed frame is stored in the second compressed frame buffer without being further processed by an encoder.

6. The system of claim 4, wherein the frame decoding part further includes a frame type selector configured to determine whether the compressed frame is a standard frame or a difference frame.

7. The system of claim 6, wherein the second compressed frame buffer is configured to store the compressed frame as the new decode reference frame in response to a determination by the frame type selector that the compressed frame is a standard frame.

8. The system of claim 6, wherein the decode output unit is configured to output the reconstructed frame in response to a determination by the frame type selector that the compressed frame is a difference frame.

9. The system of claim 7, wherein the frame decoding part further comprises an encoder configured to compress the reconstructed frame to generate a compressed reconstructed frame.

10. The system of claim 9, wherein the second compressed frame buffer is configured to store the compressed reconstructed frame as the new decode reference frame in response to a determination by the frame type selector that the compressed frame is a difference frame.

11. The system of claim 4, wherein generating the reconstructed frame includes:
    decompressing the compressed frame to generate a first addend frame,
    decompressing the decode reference frame to generate a second addend frame, and
    summing the first and second addend frames to generate the reconstructed frame.

12. A method of transmitting display data, the method comprising:
    receiving a source frame by a frame encoding part;
    generating a difference frame using the source frame and an encode reference frame;
    storing the source frame as a new encode reference frame, the source frame being stored having been compressed; and
    outputting either the source frame or the difference frame as a compressed frame, the source frame or the difference frame being output having been compressed,
    wherein the difference frame is output in response to a determination that, when the frames respectively derived from the source frame and the difference frame are each compared to the source frame, a frame derived from the difference frame has an image quality closer to the source frame.

13. The method of claim 12, further comprising comparing an image quality of frames respectively derived from the source frame and the difference frame.

14. The method of claim 13, wherein the image quality of frames respectively derived from the source frame and the difference frame includes comparing against the source frame.

15. The method of claim 13, wherein the source frame is output in response to a determination that a frame derived from the source frame has a better image quality.

16. The method of claim 12, further comprising:
    receiving the compressed frame by a frame decoding part;
    generating a reconstructed frame using the compressed frame and a decode reference frame;
    storing the compressed frame as a new decode reference frame; and
    outputting the reconstructed frame.

17. The method of claim 16, wherein the compressed frame is stored as the new decode reference frame without being further processed by an encoder.

18. The method of claim 16, further comprising determining whether the compressed frame is a standard frame or a difference frame.

19. The method of claim 18, wherein the compressed frame is stored as the new decode reference frame in response to a determination that the compressed frame is a standard frame.

20. The method of claim 19, wherein the reconstructed frame is output in response to a determination that the compressed frame is a difference frame.

21. The method of claim 19, further comprising compressing the reconstructed frame to generate a compressed reconstructed frame.

22. The method of claim 21, further comprising storing the compressed reconstructed frame as the new decode reference frame in response to a determination by the frame type selector that the compressed frame is a difference frame.

23. The method of claim 16, wherein generating the reconstructed frame includes:
- decompressing the compressed frame to generate a first addend frame,
- decompressing the decode reference frame to generate a second addend frame, and
- summing the first and second addend frames to generate the reconstructed frame.

* * * * *